US012791329B2

(12) United States Patent
Engel et al.

(10) Patent No.: US 12,791,329 B2
(45) Date of Patent: Nov. 10, 2026

(54) METHOD AND SYSTEM FOR DETERMINING A STARTING POINT BETWEEN TWO ENTITIES

(71) Applicant: MERCEDES-BENZ GROUP AG, Stuttgart (DE)

(72) Inventors: Michael Engel, Stuttgart (DE); Mark Gerban, Hamburg (DE); Benjamin Lange, Gärtringen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 191 days.

(21) Appl. No.: 18/286,571

(22) PCT Filed: Apr. 8, 2022

(86) PCT No.: PCT/EP2022/059373
§ 371 (c)(1),
(2) Date: Oct. 12, 2023

(87) PCT Pub. No.: WO2022/218842
PCT Pub. Date: Oct. 20, 2022

(65) Prior Publication Data
US 2024/0192000 A1 Jun. 13, 2024

(30) Foreign Application Priority Data
Apr. 13, 2021 (DE) ..................... 10 2021 001 911.3

(51) Int. Cl.
*G01C 21/34* (2006.01)

(52) U.S. Cl.
CPC ..... *G01C 21/3438* (2013.01); *G01C 21/3415* (2013.01)

(58) Field of Classification Search
CPC ............ G01C 21/3438; G01C 21/3415; G06Q 50/40; G06Q 50/60; G06Q 10/083
See application file for complete search history.

(56) References Cited

U.S. PATENT DOCUMENTS 9,347,783 B2 5/2016 Samuel
10,126,138 B1 11/2018 Farmer et al.
(Continued)

FOREIGN PATENT DOCUMENTS

DE 102006034413 A1 1/2008
DE 102009056641 * 6/2011 ............. G06Q 50/00
(Continued)

OTHER PUBLICATIONS

U.S. Non-Final Office Action for U.S. Appl. No. 18/285,676, dated May 12, 2025, 29 pages (Year: 2025).*
(Continued)

*Primary Examiner* — Christian Chace
*Assistant Examiner* — Minato Lee Horner
(74) *Attorney, Agent, or Firm* — PATENT PORTFOLIO BUILDERS PLLC

(57) ABSTRACT

A method for determining a starting point between two entities that are configured to determine their location and to communicate using a communication interface. The locations of the entities are determined in map material. A route, composed of at least two route points each connected by a route section, between the two locations of the entities is determined in the map material. In order to iteratively ascertain a position of the starting point on the route, the route sections included in the route are subdivided into route subsections with the result that a section of the route extending from the location of a first entity to the starting point can be covered in the same time and/or has the same length as a section of the route extending from the location of a second entity to the starting point.

7 Claims, 2 Drawing Sheets

(56) References Cited

U.S. PATENT DOCUMENTS

| | | | |
|---|---|---|---|
| 2009/0017803 A1 | 1/2009 | Brillhart et al. | |
| 2014/0222328 A1 | 8/2014 | Baca et al. | |
| 2016/0107750 A1 * | 4/2016 | Yates | B64U 10/25 244/2 |
| 2016/0257401 A1 | 9/2016 | Buchmueller et al. | |
| 2017/0122756 A1 * | 5/2017 | Chen | G01C 21/3484 |
| 2018/0149484 A1 * | 5/2018 | Baer | G01C 21/3438 |
| 2018/0356240 A1 * | 12/2018 | Chen | G01C 21/3438 |
| 2019/0012636 A1 * | 1/2019 | Simon | G08G 5/56 |
| 2020/0019925 A1 | 1/2020 | Tokhtabaev | |
| 2020/0080853 A1 | 3/2020 | Tam et al. | |
| 2020/0103242 A1 | 4/2020 | Chachra et al. | |

FOREIGN PATENT DOCUMENTS

| | | | | |
|---|---|---|---|---|
| EP | 3514061 A1 | 7/2019 | | |
| JP | 2002257580 A | 9/2002 | | |
| JP | 2005227168 A | 8/2005 | | |
| JP | 2008085945 * | 4/2008 | H04W 4/02 | |
| JP | 2009536372 A | 10/2009 | | |
| KR | 1020100049859 A | 5/2010 | | |
| WO | 2007131044 A2 | 11/2007 | | |
| WO | 2016134315 A1 | 8/2016 | | |
| WO | WO2016134315 * | 8/2016 | G01C 21/3438 | |
| WO | 2019112566 A1 | 6/2019 | | |

OTHER PUBLICATIONS

Office Action dated Sep. 24, 2024 in related/corresponding JP Application No. 2023-562342.

International Search Report and Written Opinion mailed Jul. 18, 2022 in related/corresponding International Application No. PCT/EP2022/059373.

Office Action created Dec. 22, 2021 in related/corresponding DE Application No. 10 2021 001 911.3.

ZENKER; "People go out together: a neglected context factor in pedestrian assistance systems;" Proceedings of the 2nd Workshop on Context Aware Intelligent Assistance, CAIA 2011; Oct. 4, 2011; Berlin, DE; http://ceur-ws.org/Vol-786/paper4.pdf.

Office Action dated Jan. 21, 2025 in related/corresponding JP Application No. 2023-562342.

Office Action dated Aug. 21, 2025 in related/corresponding KR Application No. 10-2023-7034650.

Office Action dated Sep. 5, 2025 in related/corresponding EP Application No. 22717840.7.

Office Action dated Apr. 30, 2026 in related/corresponding CN Application No. 202280027854.1.

* cited by examiner

METHOD AND SYSTEM FOR DETERMINING A STARTING POINT BETWEEN TWO ENTITIES

BACKGROUND AND SUMMARY OF THE INVENTION

Exemplary embodiments of the invention relate to a method for determining a starting point between two entities, as well as a system for determining the starting point.

Often two entities, for example persons, want to meet at a location, for example in order to have coffee or go for a walk. Furthermore, the daily business of a delivery service consists of providing goods to different locations. For this purpose, the delivery service operates a means of transport that brings the goods from a starting point to, for example, two different delivery locations.

The question arises as to where exactly the two persons should meet, or where the starting point for the delivery should be selected so that both persons have an approximately equally long path to the meeting point, or the two delivery locations can be reached equally fast starting from the starting point. This ensures the fastest possible arrival at the meeting point or delivery of the goods. Furthermore, the journey of the two persons to a meeting point centrally located in the middle in terms of time and/or place between the location of the persons is particularly fair, since this keeps either person from having to travel much longer than the other person.

In the following, entities may be understood to mean, for example, persons, mobile terminals such as a smartphone, laptop, tablet computer, wearable or the like. A corresponding person or computing unit can also be assigned to a means of transport. Any road, rail, water, and aircraft can be considered a means of transport. The computing unit can also be integrated into the means of transport.

A search method and a search apparatus for finding a meeting point is known from KR 1020100049859 A, wherein the meeting point corresponds to a midpoint between two entities meeting at the meeting point. To determine a suitable meeting point located approximately in the middle between the entities, points of interest (POIs) located near the midpoint are searched and evaluated for their suitability for the meeting. In so doing, a distance between the two entities in map material is ascertained and halved to determine the midpoint.

Exemplary embodiments of the present invention are directed to an improved method and system for determining such a starting point between two entities, with the aid of which a position of the starting point between the entities can be determined very efficiently and precisely in different starting situations.

In a method for determining the starting point between two entities, the two entities are capable of determining their location and communicating by means of a communication interface. According to the invention, the locations of the entities are determined in map material, a route, composed of at least two route points each connected by means of a route section, between the two locations of the entities is determined in the map material, and in order to iteratively ascertain a position of the starting point on the route, the route sections included in the route are subdivided into route subsections, with the result that a section of the route extending from the location of a first entity to the starting point can be covered in the same time and/or has the same length as a section of the route extending from the location of a second entity to the starting point, wherein an entity moves, with a means of transport assigned thereto, along the route in each case.

With the aid of the method according to the invention, the starting point between the entities can be determined in a particularly fair manner; both entities accordingly cover the same distance to reach the starting point and/or require the same amount of time to do so. In so doing, an influence of a means of transport used by a particular entity on a travel duration or route is taken into account. For example, if the first entity travels by car and the second entity travels by bicycle, the distance covered by the first entity may have a greater length than the distance traveled by the second entity because the car typically travels faster than the bicycle. In this case, the distance to be covered by the car and the distance to be covered by the bicycle can be covered by the particular means of transport in the same time period. In this context, the same time duration or path length is to be understood as an equivalent duration or path length minus or plus a defined tolerance range.

By subdividing the route between the original locations of the first and second entity into at least one route section, the starting point on the route can be positioned particularly precisely at an actual local and/or temporal midpoint on the route. Especially in the case of a complex route composed of a plurality of different route sections, it is thereby ensured that the two entities actually also have to cover the same path length and/or the necessary time period for reaching the starting point. For example, a route section can be formed by a road section such as a straight road or a curve, wherein each route section is provided with parameters. These parameters include, for example, a path length of the route section, a duration required to cover the route section at a driving speed typical for the means of transport, a speed limit applicable to the route section, or the like.

Analogous to the prior art, points of interest (POIs) located in a vicinity of the route can be taken into account to determine the position of the starting point. The starting point can, for example, therefore also be shifted closer in the direction of the first or second entity if there is a goal that is interesting for the entities, such as, for example, a cafe, a book store, a park or the like.

By subdividing a route section into route subsections, a position of the starting point on the route can be found even more precisely. Therefore, right when subdividing the route, it is unlikely that the starting point will coincide with a route point or midpoint of a route section. By subdividing the route section including the starting point into route subsections, the starting point can be placed on an end point or midpoint of a route subsection, wherein the features such as path length, travel time, speed limit, and the like of the route section are correspondingly subdivided. If the starting point does not coincide with an endpoint or midpoint of a route subsection by a first iteration, i.e., does not lie within a tolerance range in the intended local and/or temporal center between the starting points of the entities, then the route section including the starting point can be further subdivided in another iteration. A starting point lying on a midpoint of a route section corresponds to a starting point lying on an end point of a route subsection.

To determine the location of an entity, the entity can have any locating device, for example a receiver of a global navigation satellite system. In addition to its location, the entity can also transmit additional information via the communication interface. In so doing, the communication can take place directly between the entities or also indirectly via a third computing unit. Any proven communication technologies can be used as the communication technology. For example, the communication can be wireless, in particular by means of mobile radio, Wi-Fi, Bluetooth, NFC or the like.

Calculating the route and finding the starting point on the route is optionally performed on a central computing unit and/or on at least one of the two entities. For this purpose, the two entities transmit their particular location to the central computing unit and/or the other entity by means of the communication interface.

If the determined starting point is within a predetermined tolerance range, the two entities may be required to agree to the ascertained position of the starting point and a width of the tolerance range before beginning their journey to the starting point. In this way, it is ensured that the starting point is not disadvantageously shifted too close to one of the entities. With the aid of the tolerance range, an arrival of an entity at the starting point at a later time than an agreed time, for example due to a delay from congestion and/or a schedule deviation, can be compensated.

An advantageous development of the method provides that the first and second entity arrive at the starting point starting from their particular locations. As already mentioned, the starting point can be, for example, a cafe, a book store, a park or the like, from which the two entities start a common activity. In this example, the starting point could also be interpreted as a meeting point or rendezvous point.

According to another advantageous embodiment of the method, at least one third entity travels from the starting point, along the distance extending from the location of the first entity to the starting point, to the location of the first entity, and at least one fourth entity travels from the starting point, along the route extending from the location of the second entity to the starting point, to the location of the second entity.

The method according to the invention can therefore also be used to optimize a route to be covered by a means of transport of a delivery service or a time required for this purpose. In this way, a delivery service is able to send a distribution vehicle to the starting point, wherein the distribution vehicle comprises drones, in particular autonomously controlled drones, which then fan out along the respective route to the location of the first and second entities. Since to do this, the same amount of time is preferably required to cover the distance to reach the first and second entities, the drones are particularly reliably enabled to arrive back at the distribution vehicle at the same time as the goods to be delivered are handed over. This can improve the efficiency of distributing goods for the delivery service. In this context, it is also possible for persons to travel with the distribution vehicle who then travel from the starting point, for example, with the same or also a different means of transport to the location of the first and second entity. The delivery service may be, for example, a parcel delivery service, a food delivery service, or the like. In addition to POIs such as an optimal parking position for the distribution vehicle, further map information can be read out from the map material, for example a no-fly zone for unmanned drones.

Another advantageous embodiment of the method further provides that the locations of the entities are determined in map material provided by at least two map providers, wherein the locations of a particular entity determined in the different map material are compared with each other. By using map material provided by different map providers, the location of a particular entity and ultimately also a position of the starting point on the route can be determined more precisely. By comparing map data from different providers, position deviations or an inaccurately determined position of an entity can be determined and corrected. The map material of the various map providers can also include different POIs and/or map information. This increases the amount of information used to carry out the method according to the invention. As a result, the method can be used even more reliably.

According to another advantageous embodiment of the method, current traffic information is taken into account in the calculation of the route between the first and the second entity. For example, if the first entity travels by car, there may be a traffic jam on the route traveled by the first entity. This lengthens the time period required to travel the route. If, for example, the second entity travels by public transport such as a subway, streetcar, commuter train, city bus or the like, delays may also occur. Information about possible traffic jams and/or route changes can be acquired from proven third-party sources. These delays are advantageously taken into account when determining the starting position. If, for example, the time required to cover a distance is extended by such a delay, the starting point is shifted such that both entities still arrive at the starting point at the same time plus or minus the specified tolerance threshold, or third and fourth entities fanning out from the starting point arrive at the location of the first and second entities at the same time. This ensures that a position of the starting point is determined very fairly and accurately, even in realistic traffic situations.

Another advantageous embodiment of the method further provides that at least one entity moves along the route by one of the following means of transport;

- on foot,
- by bicycle;
- by e-scooter;
- by means of public transportation, in particular by means of a bus and/or train;
- by car, in particular a passenger car, truck and/or a van;
- by aircraft; or
- by an autonomously controllable vehicle, in particular a drone, preferably a flying drone.

In general, it is also conceivable for the entity to also change the means of transport during its journey along the route. For example, the entity may walk during a first route segment, then switch to a bicycle, and cover a final route section by bus, for example. The entity can also use an e-scooter, for example. This makes it possible to use the method according to the invention in even more extensive and different travel situations.

For example, if both entities travel by train, stops located within environs of a specified radius around a location of the particular entity are ascertained in map material for each entity, and connections originating from the particular stops including potential transfer possibilities to the particular stop in the vicinity of the other entity are ascertained and analyzed with regard to their travel time. To determine the total travel time for an entity, for example, a distance and/or time duration that the particular entity has to cover to the stop, for example, on foot, is also taken into account. As a starting point, a stop on the route between the locations of the entities, which can be reached at the same time by the two entities and/or is at the same distance, is then ascertained. The starting point can also lie outside a corresponding stop, for example a cafe in the vicinity of a corresponding stop. It is also conceivable that one entity travels by train and one entity travels exclusively on foot.

Similarly, one of the entities can travel by bicycle and one of the entities can walk. In this case, to determine the starting point, average travel speeds for the particular entities are assumed. The travel speeds of the particular entities can also be learned depending on a means of transport selected by them. Thus, the travel behavior of a specific entity can be observed over a period of time, resulting in time and/or route-dependent movement speeds. For example, if the first entity travels a certain distance for a certain time by subway, it can require a longer time to do this, for example, during rush hour due to a large number of people getting on and off. If, for example, the second entity travels by bicycle, it may take it a shorter or longer period of time to travel a particular section of the route, for example if the second entity has to travel uphill or downhill, or for example travels slower after lunch due to a full stomach.

In accordance with another advantageous embodiment of the method, an algorithm for determining the position of the starting point on the route performs at least the following steps:

calculating the route between the locations of the two entities, halving the calculated route with respect to a path length of the route or a time required to cover the route for determining a half distance;

as long as a current distance originating from one of the locations is smaller than half the distance: adding the next subsequent route section to the current distance;

as soon as the current distance is greater than half the distance: subdividing the last added route section into "n" route subsections; and as long as the current distance minus the last added route section is smaller than the half distances: adding the next subsequent route subsection to the current distance.

By subdividing the route into route sections or route subsections and taking into account map material provided by different map providers, a position of the starting point can be found very precisely on a local and/or temporal midpoint between the two entities. The steps carried out for this purpose by the algorithm allow a very fast and efficient implementation of the algorithm. To subdivide the route into the route sections, route points on the route are determined. The route points correspond, for example, to a transition from a straight road to a curve or the like in the map material. In this way, the algorithm checks for each route section whether the midpoint between the first and the second entity has been reached. If no exact midpoint can be found on a corresponding route section and/or a route point, a corresponding route section is subdivided into route sections. This ensures that the position of the starting point is found particularly midway between the locations of the first and second entities. Accordingly, when determining the route, it is taken into account which means of transport uses the particular entity.

Another advantageous embodiment of the method further provides that the starting point is recalculated taking into account a current location of at least one of the entities. If, for example, a delay occurs during the journey along the route for at least one entity, this would result in both entities not arriving at the starting point at the same time. Similarly, in the example of the delivery service, the goods would not arrive at the two entities at the same time, and/or drones delivering the goods would not return to the distribution vehicle at the same time. However, by monitoring the current position of the particular entity along the route during the journey, the position of the starting point on the route can be adaptively shifted. As a result, a simultaneous arrival of the entities at the starting point or the arrival of the goods at the original locations of the first and second entity can be ensured. Also, when the drones return to the distribution vehicle, the distribution vehicle can move toward a drone if that drone takes longer than expected for its return.

Preferably, at least one of the following criteria is also taken into account for determining the position of the starting point on the route:

fairness, an amount of pollutant, in particular an amount of $CO_2$, arising by moving at least one means of transport along the route;

an amount of energy required by at least one means of transport for moving along the route; and/or costs incurred to move at least one means of transport along the route.

By taking into account at least one of the aforementioned criteria, a shift of the starting point on the route can be adapted as preferred by customers. For example, according to a first scenario, the starting point can be positioned on the route such that the first and second entity reach the starting point after the shortest possible period of time. For example, the first entity travels to the starting point with a passenger car, but the second entity must change the means of transport several times to reach the starting point. This is associated with a great deal of effort for the second entity. While considering fairness, the starting point on the route can be shifted so that a longer duration is required for the first and second entities to reach the starting point, but the first and second entities must overcome a similar effort to reach the starting point. For example, the starting point can then be set to a stop of a public means of transport, whereupon both the first and second entity will travel with public transportation to the starting point. To do this, the first and second entities must then transfer the same number of times.

Acceptance to carry out the method according to the invention can be increased by taking into account an amount of pollutants produced by environmentally conscious persons.

Accordingly, an amount of energy required to travel along the route and/or associated costs incurred to position the starting point on the route may also be considered.

In particular, a customer is able to decide which one or ones of the named criteria should additionally be taken into account for determining the position of the starting point. This ensures particularly high comfort and satisfaction when using the method according to the invention.

In a system for determining a starting point between two entities comprising at least two entities, wherein the entities are each configured to determine their location and share it via a communication interface, according to the invention at least the two entities are configured to perform a method described above.

The entities are, for example, persons or computing units, for example in the form of a mobile terminal such as a smartphone, tablet computer, laptop, wearable or the like. The persons and/or computing units can travel by a means of transport such as a passenger car, truck, van, bus, a train, a bicycle, by foot or the like. A change of the means of transport during a journey of an entity is also possible. At least one entity can also be integrated into a corresponding means of transport. For example, an entity can be formed by a computing unit of a vehicle.

The two entities can also communicate indirectly via a central computing unit. The central computing unit can also determine the starting point for the two entities. For this purpose, the central computing unit receives the locations of the two entities and, using a method according to the invention, ascertains the starting point for meeting or fanning out drones.

Further advantageous embodiments of the method according to the invention for ascertaining the starting point between the entities also result from the exemplary embodiments which are described in more detail below with reference to the figures.

BRIEF DESCRIPTION OF THE DRAWING FIGURES

DETAILED DESCRIPTION

Figure 1:
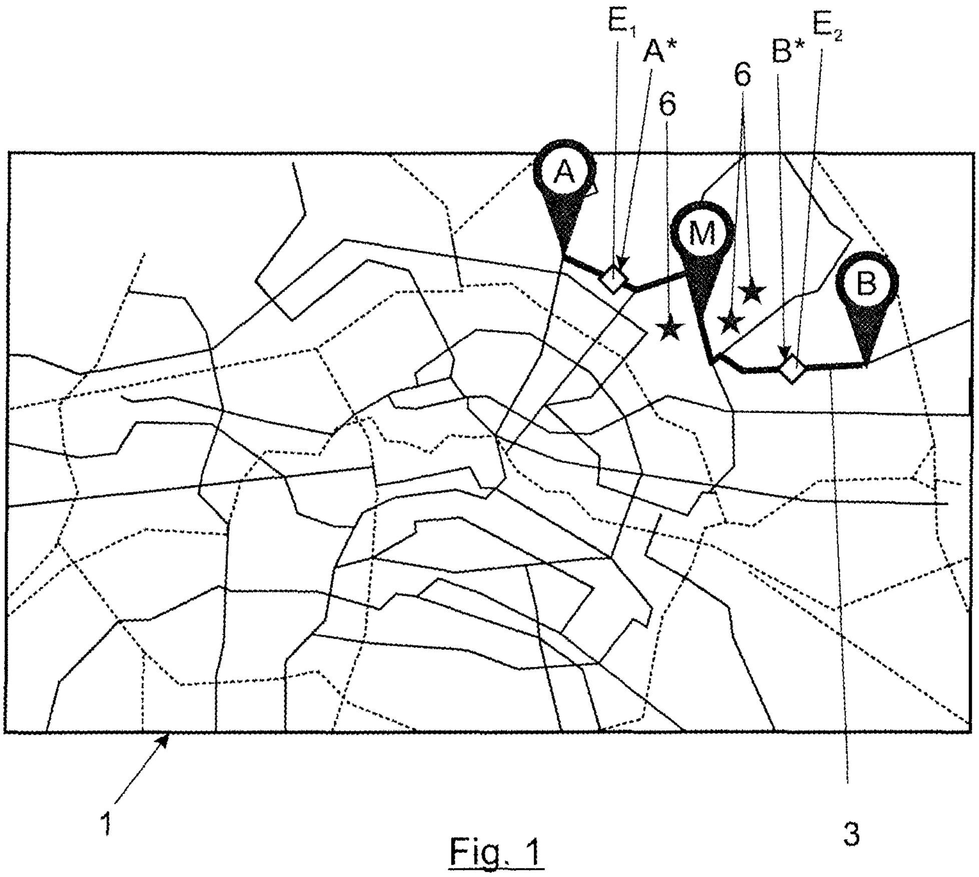
FIG. 1 shows a schematic representation of two entities meeting at a starting point in a digital road map.

FIG. 1 shows map material 1, here in the form of a digital road map. In the example in FIG. 1, the digital road map comprises a section of a metropolitan area, for example a large city. In the large city, there are two entities $E_1$ and $E_2$ at respective locations A and B. The two entities $E_1$ and $E_2$ have agreed to meet. With the aid of a method according to the invention, a starting point M is determined that the two entities $E_1$ and $E_2$ can reach in equal time and/or by covering the same distance. The first entity $E_1$ is located at an original location A and the second entity $E_2$ at an original location B. The starting point M is located centrally between the two locations A and B within a tolerance range 8 shown in FIG. 2.

The entities $E_1$ and $E_2$ are, for example, persons or computing units, for example in the form of a mobile terminal such as a smartphone, tablet computer, laptop, wearable or the like. Such a computing unit can also be integrated in a vehicle. For example, the computing unit can then be a central on-board computer of a vehicle, a control device of a vehicle subsystem, a telematics unit or the like.

The two entities $E_1$ and $E_2$ each move by a means of transport through the large city. For example, entities $E_1$ and $E_2$ are underway on foot, by bicycle, by e-scooter, by public transit, by a privately operated vehicle such as a car, truck, van, or the like, and/or by an autonomously operated vehicle such as a drone. In this case, even during a trip from an original location A, B to the starting point M, it is possible to change the means of transport once or several times. For example, an entity $E_1$, $E_2$ in the form of a person may travel from their home to a stop for local public transport by an e-scooter and then travel by, for example, a bus to a stop located in the vicinity of the starting point M and reach the starting point M from the stop on foot.

According to the invention, the starting point M is located centrally between the locations A, B of the entities $E_1$, $E_2$ with respect to a path length and/or a time duration required to cover a distance between the starting point M and the respective locations A, B of the entities $E_1$, $E_2$. To determine a position of the starting point M between the entities $E_1$ and $E_2$, a different travel speed is observed depending on a selected means of transport.

To ascertain the starting point M, the entities $E_1$ and $E_2$ determine their particular location A, B. Then a route 3 extending from the location A of the first entity $E_1$ to the location B of the second entity $E_2$ is ascertained. The route 3 is halved in order to determine the starting point M with respect to its path length and/or time required to cover the route 3. While the two entities $E_1$ and $E_2$ travel to the starting point M, they move along the route 3. In so doing, they can detect their current location A* and B*. According to one embodiment of the method according to the invention, the respective current location A*, B* can be used to adaptively shift the starting point M. For example, if one of the entities $E_1$, $E_2$ is in a traffic jam, the starting point M can be closer to the respective entity $E_1$, $E_2$. This ensures that the two entities $E_1$ and $E_2$ arrive simultaneously as planned at the starting point M.

It is also possible that one or more POIs 6 are located close to the route 3, and the starting point M is placed on one of these POIs 6 or in a vicinity thereof. For example, the POI 6 can be a cafe, a bookstore, a park or the like. In other words, the two entities $E_1$ and $E_2$ plan to meet at one of the POIs 6.

To improve the accuracy with which the respective locations A, A*, B, B* are determined, it is possible according to one embodiment of the method according to the invention to use map material 1 provided by different map providers.

The procedure for halving the route 3 will be explained in more detail with reference to FIG. 2. Accordingly, the route 3 is composed of a plurality of route sections $P_1$, $P_2$, $P_3$, $P_4$, $P_5$, $P_6$. A route section $P_1$, $P_2$, $P_3$, $P_4$, $P_5$, $P_6$ extends between two route points 2. For example, a route section $P_1$, $P_2$, $P_3$, $P_4$, $P_5$, $P_6$ corresponds to a specific road section, for example a straight road section or a curve. The route points 2 are, for example, a traffic light, intersection, a traffic circle or the like. By subdividing the route 3 into the route sections $P_1$, $P_2$, $P_3$, $P_4$, $P_5$, $P_6$, the route 3 can be very realistically reproduced, and the starting point M can accordingly be positioned very precisely in the middle between the two locations A and B.

Figure 2:
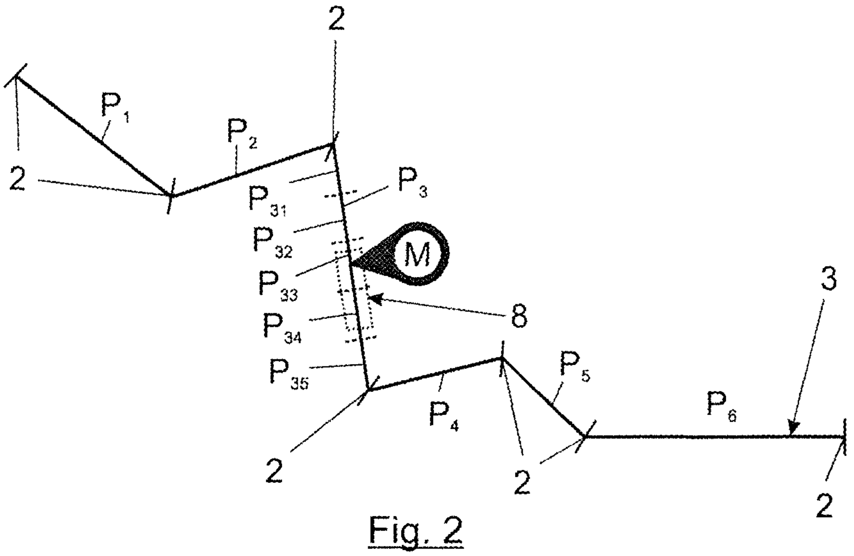
FIG. 2 shows a schematic representation of a route subdivided into a plurality of route sections.

Since it is to be expected that the starting point M does not necessarily coincide with a route point 2, a route section $P_1$, $P_2$, $P_3$, $P_4$, $P_5$, $P_6$, here the third route section $P_3$ in the example in FIG. 2, can be subdivided into "n" route subsections $P_{31}$, $P_{32}$, $P_{33}$, $P_{34}$, $P_{35}$. This subdivision can be continued iteratively until the starting point M lies in the middle in a route subsection $P_{31}$, $P_{32}$, $P_{33}$, $P_{34}$, $P_{35}$, on a route point 2, or an end point of a route subsection $P_{31}$, $P_{32}$, $P_{33}$, $P_{34}$, $P_{35}$. Each route section $P_1$, $P_2$, $P_3$, $P_4$, $P_5$, $P_6$ is associated with a corresponding path length or a time required to cover the respective route section $P_1$, $P_2$, $P_3$, $P_4$, $P_5$, $P_6$ depending on a selected means of transport.

A starting point M is understood to be placed in the "middle" between the locations A and D of the entities $E_1$ and $E_2$ when it is within a specified tolerance range 8 on a route section $P_1$, $P_2$, $P_3$, $P_4$, $P_5$, $P_6$ or a route subsection $P_{31}$, $P_{32}$, $P_{33}$, $P_{34}$, $P_{35}$. The representation is not true to scale.

Figure 3:
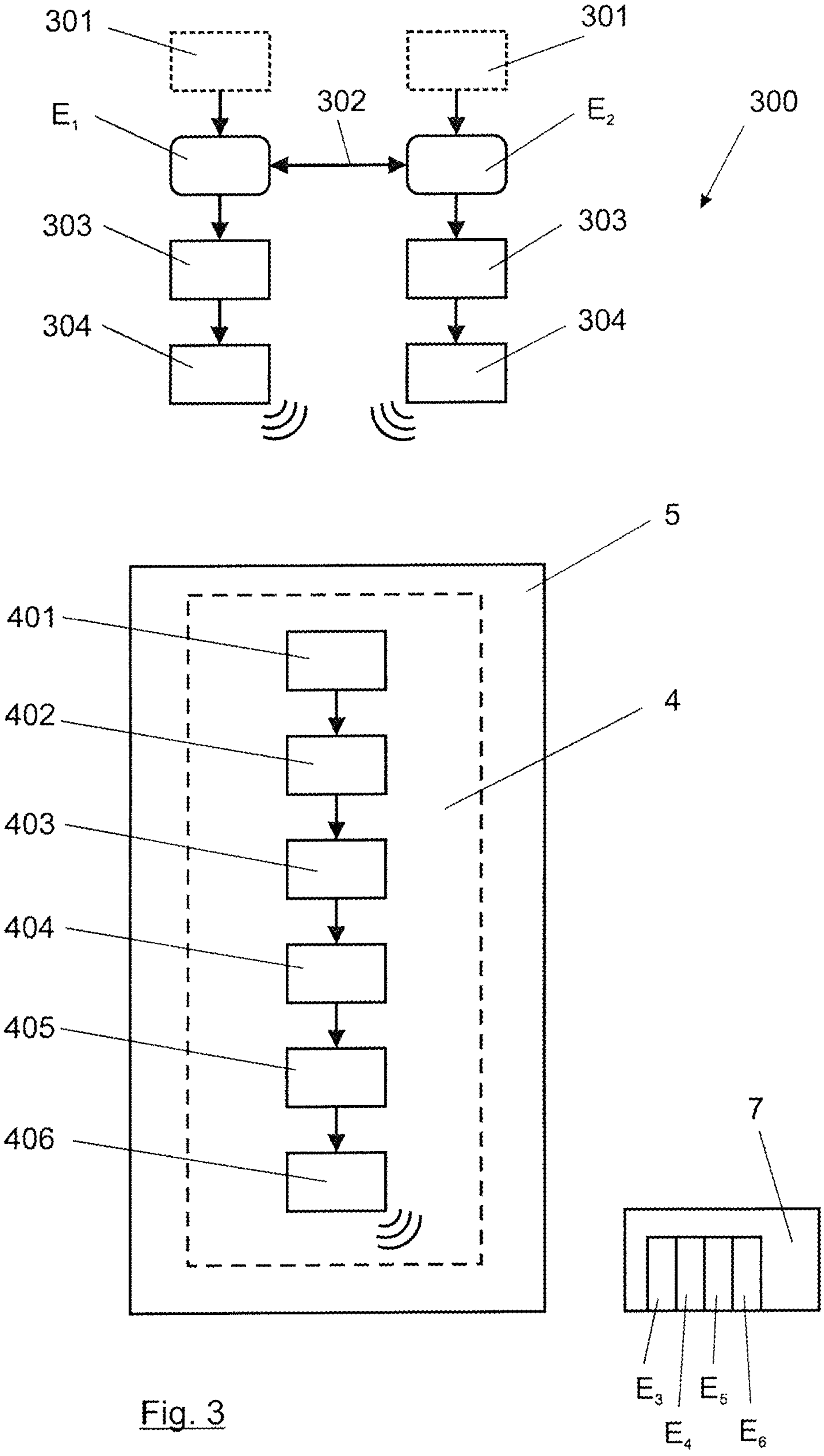
FIG. 3 shows a schematic diagram of a flow chart of a method according to the invention for ascertaining the starting point between the entities.

According to an embodiment of the method according to the invention, it is also possible for a distribution vehicle 7, which is shown in FIG. 3, to travel to the starting point M and further entities $E_3$, and $E_4$ such as drones to fan out from the distribution vehicle 7 to the locations A and B of the entities $E_1$ and $E_2$. For example, the drones can deliver goods to the first and second entity $E_1$ and $E_2$. The goods can be, for example, packages or food.

FIG. 3 shows a flow chart 300 of the method according to the invention. In an optional method step 301, the two entities $E_1$, $E_2$ can determine whether additional criteria are to be taken into account for determining the starting point M. The additional criteria are, for example, fairness, an amount of pollutant arising by moving at least one means of transport along the route 3, in particular in the form of $CO_2$, an amount of energy required by at least one means of transport for moving along the route 3, and/or associated costs.

In a method step 302, the two entities $E_1$ and $E_2$ arrange to meet at the starting point M. In a method step 303, the respective entities $E_1$ and $E_2$ determine their original location A, B and forward this in method step 304. In the example in FIG. 3, the respective location A, B is transmitted to a central computing unit 5, for example a cloud server or a backend of a service provider. The starting point M is then determined by the central computing unit 5. For this purpose, an algorithm 4 is run on the central computing unit 5. The algorithm 4 comprises six work steps 401, 402, 403, 404, 405, and 406. In work step 401, the route 3 between the locations A and B of the two entities $E_1$ and $E_2$ is determined. In work step 402, the route 3 is halved with respect to its path length and/or a time required for covering the route 3. In work step 403, a distance originating from one of the locations A, B is extended by adding route sections $P_2$, $P_3$, $P_4$, $P_5$. If in work step 404 the distance extended in this way is ultimately greater than half the distance, the last added route section $P_3$ is subtracted from the distance, and this route section $P_3$ is subdivided into "n" route subsections $P_{31}$, $P_{32}$, $P_{33}$, $P_{34}$, $P_{35}$; in the example in FIG. 2, the five route subsections are $P_{31}$, $P_{32}$, $P_{33}$, $P_{34}$, $P_{35}$. In work step 405, the route subsections $P_{31}$, $P_{32}$, $P_{33}$, $P_{34}$, $P_{35}$ are added to the distance until the distance is equal to or greater than half the distance. Accordingly, the starting point M is finally found in step 406. This is then transmitted back to the two entities $E_1$ and $E_2$ so that they can begin their journey to the starting point M.

It is also possible for a position of the starting point M and/or further information associated therewith to be transmitted to a distribution vehicle 7. The distribution vehicle 7 comprises further entities, here in the form of a third, fourth, fifth and sixth entity $E_3$, $E_4$, $E_5$, $E_6$. These can be, for example, individual persons or autonomous drones, for example drones capable of flying which deliver goods, food, or the like to the two entities $E_1$ and $E_2$. If the distribution vehicle 7 is in the starting point M when the third and fourth entity $E_3$ and $E_4$ fan out from the distribution vehicle 7, the third and fourth entity $E_3$ and $E_4$ can reach the first and second entity $E_1$ and $E_2$ at the same time and preferably also return to the distribution vehicle 7 at the same time. As a result, a delivery service can distribute goods to customers very effectively and efficiently.

In general, it is also possible for the two entities $E_1$ and $E_2$ to communicate their locations A and B to each other, and to dispense with data transmission to the central processing unit 5. For example, the algorithm 4 can also be run on one or both entities $E_1$ and $E_2$. Accordingly, one of the entities $E_1$ and $E_2$ transmits the starting point M that it determined back to the other entity Eland $E_2$.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for determining a starting point between at least first and second entities, wherein the first entity determines its own location as a first entity location and the second entity determines its own location as a second entity location, wherein the first and second entities communicate using a communication interface, the method comprising:

determining the first and second entity locations in map material, wherein the first and second entities are computing units;

determining a route, composed of at least two route points each connected by a route section, between the first and second entity locations in the map material;

iteratively determining a position of the starting point on the route by subdividing the route sections included in the route into route subsections to provide a section of the route extending from the first entity location to the starting point can be covered in a same amount of time or has a same length as a section of the route extending from the second entity location to the starting point;

traveling, by a third entity, which is a first vehicle, to the starting point, wherein the first vehicle comprises at least a second vehicle and a third vehicle;

traveling, by the second vehicle, along the route from the starting point to the first entity location and then returning to the starting point;

traveling, by the third vehicle, along the route from the starting to the second entity location and then returning to the starting point.

2. The method of claim 1, wherein the determining the first and second entity locations in the map material involves determining the first and second entity locations in a first map material and determining the first and second entity locations in a second map material, wherein the first and second map material are from at least two map providers, the method further comprising:

comparing the locations determined for the first entity in the first and second map material; and comparing the locations determined for the second entity in the first and second map material.

3. The method of claim 1, wherein the determination of the route between the first and second entities accounts for current traffic information.

4. The method of claim 1, wherein the second and third vehicles are flying drones.

5. The method of claim 1, wherein the determination of the position of the starting point comprises:

calculating the route between the first entity location and the second entity location;

determining a half distance by halving the calculated route with respect to a path length of the calculated route or a time required to cover the calculated route;

as long as a current distance originating from one of the first and second entity locations is smaller than the half distance, adding a next subsequent route section to the current distance;

as soon as the current distance is greater than the half distance, subdividing a last added route section into n route subsections; and as long as the current distance minus the last added route section is smaller than the half distance, adding a next subsequent route subsection to the current distance.

6. The method of claim 1, wherein an amount of $CO_2$ arising by moving at least one means of transport along the route or an energy amount required by at least one means of transport for moving along the route is also taken into account for determining the position of the starting point on the route.

7. A system for determining a starting point between at least first and second entities, the system comprises:

the first and second entities, and a third entity, which is a first vehicle, wherein the first vehicle comprises a second vehicle and a third vehicle, wherein the first entity determines its own location as a first entity location and the second entity determines its own location as a second entity location, wherein the first and second entities are configured to respectively communicate the first and second entity locations to the other one of the first and second entities, wherein the first and second entities are computing units, wherein the first and second entities are both configured to determine the first and second entity locations in map material;

determine a route, composed of at least two route points each connected by a route section, between the first and second entity locations in the map material; and iteratively determine a position of the starting point on the route by subdividing the route sections included in the route into route subsections to provide a section of the route extending from the first entity location to the starting point can be covered in a same amount of time or has a same length as a section of the route extending from the second entity location to the starting point, wherein the first and second entities each move, using a means of transport, along the route wherein the first vehicle is configured to travel to the starting point, wherein the second vehicle is configured to travel along the route from the starting point to the first entity location and then returning to the starting point, and wherein the third vehicle is configured to travel along the route from the starting to the second entity location and then returning to the starting point.

* * * * *